US011488170B1

(12) United States Patent
Mattei et al.

(10) Patent No.: US 11,488,170 B1
(45) Date of Patent: Nov. 1, 2022

(54) SYSTEMS AND METHODS FOR AUTOMATED FRAUD DETECTION AND ANALYTICS USING AGGREGATED PAYMENT VEHICLES AND DEVICES

(71) Applicant: Vantiv, LLC, Symmes Township, OH (US)

(72) Inventors: David Mattei, Loveland, OH (US); Dennis Kettler, Lebanon, OH (US)

(73) Assignee: WORLDPAY, LLC, Symmes Township, OH (US)

( * ) Notice: Subject to any disclaimer, the term of this patent is extended or adjusted under 35 U.S.C. 154(b) by 86 days.

(21) Appl. No.: 15/924,993

(22) Filed: Mar. 19, 2018

(51) Int. Cl.
*G06Q 20/40* (2012.01)
*G06Q 20/42* (2012.01)
*G06F 16/903* (2019.01)

(52) U.S. Cl.
CPC ....... *G06Q 20/4016* (2013.01); *G06F 16/903* (2019.01); *G06Q 20/4097* (2013.01); *G06Q 20/40145* (2013.01); *G06Q 20/425* (2013.01)

(58) Field of Classification Search
CPC ................................................. G06Q 20/4016
See application file for complete search history.

(56) References Cited

U.S. PATENT DOCUMENTS

| 2007/0192249 A1* | 8/2007 | Biffle | G06Q 10/02 705/44 |
| 2008/0109392 A1* | 5/2008 | Nandy | G06N 5/025 706/47 |
| 2010/0005029 A1* | 1/2010 | Nelsen | G06Q 20/3821 705/76 |
| 2017/0053281 A1* | 2/2017 | Howe | G06Q 20/108 |
| 2017/0148024 A1* | 5/2017 | Yu | G06Q 20/4016 |
| 2017/0364918 A1* | 12/2017 | Milhotra | G06Q 20/023 |
| 2018/0204215 A1* | 7/2018 | Hu | H04L 63/08 |

OTHER PUBLICATIONS

Paruchuri, H., in "Credit Card Fraud Detection using Machine Learning: A Systematic Literature Review" rom ABC Journal of Advanced Research, 6(2), pp. 113-120 (Year: 2017).*

* cited by examiner

*Primary Examiner* — Mike Anderson
*Assistant Examiner* — Brandon M Duck
(74) *Attorney, Agent, or Firm* — Bookoff McAndrews, PLLC

(57) ABSTRACT

Systems and methods are disclosed for automated fraud detection and analytics using aggregated payment vehicles and devices, at the individual and/or household level. One method includes receiving an authorization request for a payment transaction originating at a merchant, using a first payment vehicle; receiving device information of a first device used in the payment transaction; retrieving transaction data and identifying information associated with the authorization request before the authorization request is routed to a financial institution; searching and determining payment vehicles and devices associated with the individual using the retrieved identifying information; aggregating transaction data associated with the payment vehicles and devices from the transaction database; retrieving reported fraudulent activities pertaining to the payment vehicles and devices; and generating a profile data for the individual according to the identifying information associated with the authorization request, personally identifiable information (PII), the aggregated transaction data, and reported fraudulent activities.

20 Claims, 7 Drawing Sheets

SYSTEMS AND METHODS FOR AUTOMATED FRAUD DETECTION AND ANALYTICS USING AGGREGATED PAYMENT VEHICLES AND DEVICES

TECHNICAL FIELD

Various embodiments of the present disclosure relate generally to electronic payment fraud detection infrastructure and, more particularly, to automated fraud detection and analytics using aggregated payment vehicles and devices.

BACKGROUND

An average consumer in the United States carries about four to six different credit and/or debit cards in their wallet and may use different cards for different types of transactions. Traditionally, financial institutions (e.g., banks) monitor an individual's credit or debit card activity to check for any fraudulent activities. Most transaction fraud systems monitor cardholders' buying behavior at the individual card level. However, monitoring transactions at the card level provides a limited view of the spending patterns of a consumer. Additionally, monitoring buying behavior for fraudulent activities at the individual card level creates problems, since some fraudulent activity may go unnoticed, whereas valid transactions may be inadvertently declined. The most common solution today is to decline suspicious transactions even without confirmation of fraud, which then typically prompts the consumer to use a different credit/debit card to complete the transaction. This practice further results in a poor consumer experience and lost revenue opportunities for the card issuer or other financial institution.

In addition, as chips and pins, among other mechanisms, made it more difficult for fraudulent activity as it pertained to payment vehicles, the dark web and/or deep web may have enabled fraudulent activity to occur online. Moreover, fraud may occur via stolen passwords and other personal identifying information saved to devices. For example, a fraudster may gain access to someone else's device and/or somebody's e-commerce account saved to a device, and merely change the shipping address, etc., since the credit card information may already be saved to a merchant's online site.

With much personal identifiable information available on the dark web and/or deep web, fraudsters may create new accounts on e-commerce platforms, impersonate somebody else, and/or add a stolen credit card credential to that account. Thus, it becomes more imperative to safeguard not only personal information as it relates to payment vehicles (e.g., credit cards, debit cards, etc.), but also device data and biometric data.

The present disclosure may be directed to overcoming one or more of these above-referenced challenges.

SUMMARY OF THE DISCLOSURE

According to certain aspects of the disclosure, systems and methods are disclosed for establishing automated fraud detection and analytics using aggregated payment vehicles and devices, at the individual and/or household level.

In one embodiment, a computer-implemented method is disclosed for automated fraud detection and analytics using aggregated payment vehicles and devices. The method includes: receiving, by a computing system over a computer network, an authorization request for a payment transaction originating at a merchant, using a first payment vehicle; receiving, by the computing system over a computer network, device information of a first device used in the payment transaction originating at the merchant; retrieving, at the computing system, transaction data and identifying information associated with one or more of the authorization request, the first payment vehicle, or the first device before the authorization request is routed to a financial institution; and determining, by the computing system, whether an individual fraud detection profile associated with the retrieved identifying information exists in a profile database.

In the above exemplary embodiment, the method further includes: analyzing, using the computing system, the payment transaction originating at the merchant against the individual fraud detection profile as a result of determining that the individual fraud detection profile exists; determining, using the computing system, whether the payment transaction is a fraudulent activity; sending, over the computer network, as a result of determining that the payment transaction is a fraudulent activity, a notification the financial institution for the fraudulent activity; and declining, at the financial institution, the authorization request for the payment transaction.

In another embodiment, as a result of determining that the individual fraud detection profile does not exists, the method further comprises: storing, at a transaction database, as a result of determining that the individual's fraud detection profile does not exist, transaction data with other transaction data associated with the first payment vehicle or the first device; searching, by the computing system, for a second payment vehicle and/or second device associated using the identifying information at the transaction database; aggregating, by the computing system, transaction data associated with one or more of: the first payment vehicle, the second payment vehicle, the first device, or the second device, from the transaction database; retrieving, from the at least one financial institution, reported fraudulent activities pertaining to the first payment vehicle, the second payment vehicle, the first device, and/or the second device; generating profile data for an individual according to the at least one of the identifying information associated with the authorization request, personally identifiable information (PII) of the individual, the aggregated transaction data associated with the first payment vehicle, the second payment vehicle, the first device, and/or the second device, and reported fraudulent activities on the first payment vehicle, the second payment vehicle, the first device, and/or the second device; generating, by the computing system, a unique hash value for the generated profile data associated with the individual; analyzing, using the computing system, the online or brick-and-mortar payment transaction against the profile data; sending, over the computer network, as a result of determining that the payment transaction is a fraudulent activity, a notification the financial institution reporting the fraudulent activity; and declining, at the financial institution, authorization request for the payment transaction.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims. As will be apparent from the embodiments below, an advantage to the disclosed systems and methods is that multiple parties may fully utilize their data without allowing others to have direct access to raw data. The disclosed systems and methods discussed below may allow advertisers to understand users' online behaviors through the indirect use of raw data and may maintain privacy of the users and the data.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

As described above, there is a need for a universal fraud detection and profile that is based on data that is beyond merely transaction data pertaining to a payment vehicle in an individual's wallet. As it becomes easier for fraud to occur online via stolen passwords and account information, from which fraudsters may gain access to an individual's personal identifying information, there is a need to tie data pertaining to the multiple payment vehicles (e.g., credit and debit cards in a consumer's wallet) of an individual or the individual's household, combined with the multiple devices (e.g., phones, smart watches, laptops, tablets, etc.) used by the individual or the individual's household. It is contemplated that other data may be used to further strengthen fraud detection and analytics, for example, spending behavioral data, geographical and/or temporal data, criminal history, or data obtained from the Internet of Things ("IoT").

Transaction data may be aggregated in a database and indexed to consumers and/or households using retrieved identifying information associated with the transaction, such as personally identifiable information (PII) of an individual associated with the transaction, a device fingerprint, device-specific information, an originating IP address, which may be determined through IP proxy piercing, etc. The personally identifying information (PII) may be leveraged from e-commerce data, such as by e-mail address, mailing address, or other unique identifier (e.g., a hash or alpha-numeric code). This information may then be used to train and execute an aggregated fraud scoring system to better predict and act on fraudulent transactions, regardless of which issuer and/or issuer processor is associated with each card, or what device may be used to make the transaction. Thus, various embodiments of the present disclosure relate generally to analyzing online or brick-and-mortar transactions for fraudulent activity across data aggregated from across card issuers, devices, internet of things, etc., according to an individual or a household fraud detection profile.

Figure 1:
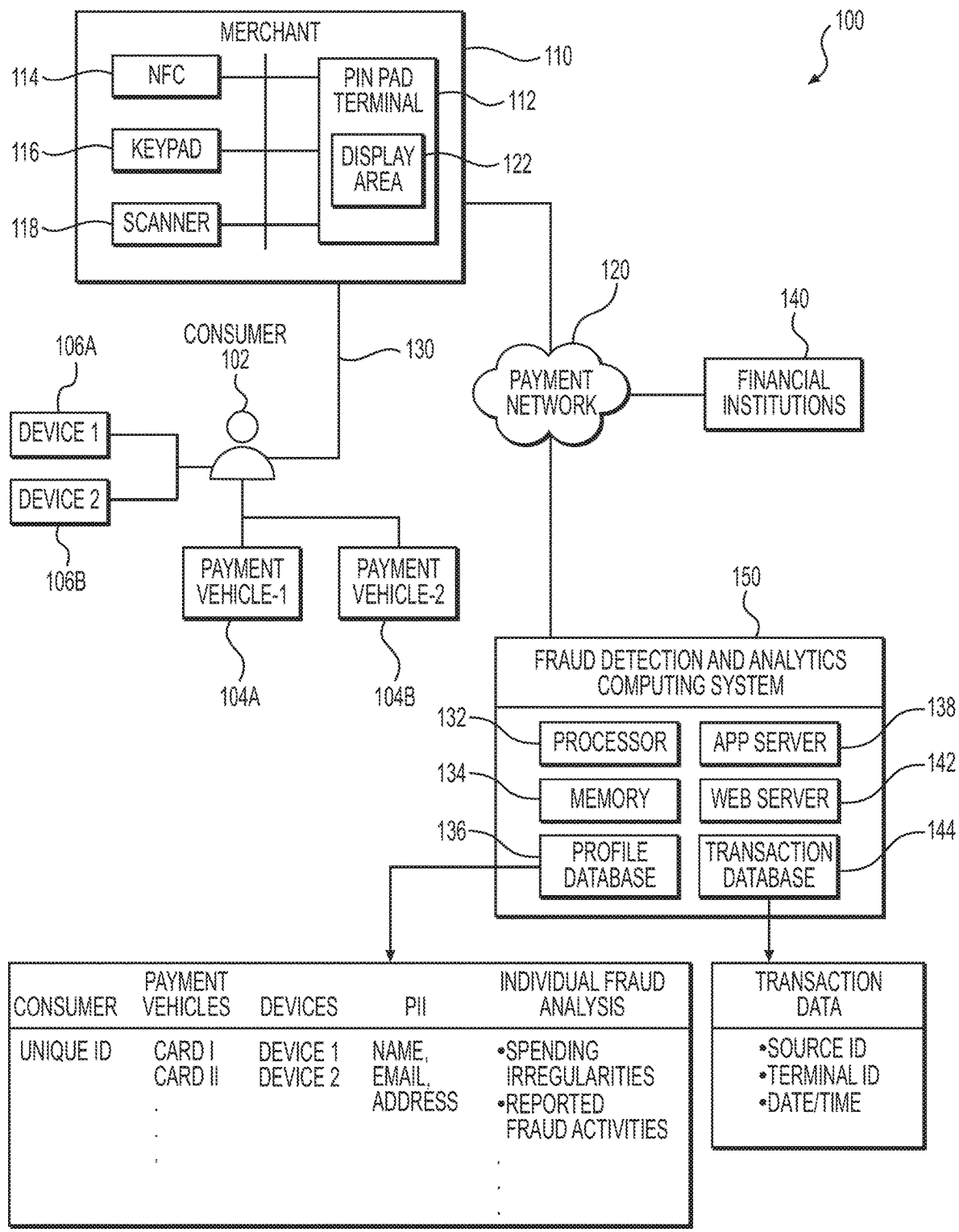
FIG. 1 depicts a block diagram of a fraud detection and analytics computing system infrastructure and aggregated database for establishing a fraud detection and analytics system from payment vehicles and devices used by consumers (e.g., at the individual level).

Turning to FIG. 1, an exemplary system infrastructure is depicted for payment processing within a merchant environment, according to one or more embodiments. In an example embodiment, a consumer 102 may use one or more payment vehicles (e.g., cards) for conducting transactions at one or more merchants 110 through a payment environment 100. Alternatively or additionally, consumer 102 may also own or use one or more devices (e.g., device 1 106A and device 2 106B), and/or may initiate the transaction using a device. As shown in FIG. 1, merchant 110 may provide infrastructure for processing electronic payment requests. Traditionally, in an electronic payment processing system, a consumer 102, during the checkout process with a merchant 110, pays for goods or services from a merchant 110 at a PIN pad terminal 112 associated with a point-of-sale ("POS") terminal. Because merchant 110 can generally use a different bank or financial institution 140 than consumer 102, an acquirer processor that handles financial transactions may transfer payment between the financial institution 140 of consumer 102 and that of merchant 110. Consumer 102 submits payment information at the PIN pad 112 associated with the merchant's POS terminal, such as by swiping his or her payment vehicle, inserting his or her chip-based payment vehicle, through wireless near field communication (NFC), etc., or by any other suitable means. PIN pad 112 may send a payment request by way of a computer network 120 to an acquirer processor (e.g., one of financial institutions 140). Alternatively, such a request may be sent by a component that controls a flow of a transaction, such as point of sale (POS) engine. The acquirer processor may request, by way of payment network 120, an electronic transfer of funds from the received funds to the financial institution 140 associated with merchant 110.

Additionally or alternatively, consumer 102 may initiate a payment transaction using a device (e.g., device 1 106A or device 2 106B). In some embodiments, e.g., during a fraud, it is contemplated that the device being used may not belong to or be owned by the consumer. Consumer 102 may use a merchant and/or e-commerce site to send a payment request for a desired good or service. In some embodiments, information pertaining to a payment vehicle to be used for the transaction may already be saved in the merchant or e-commerce site. It is also contemplated that in some embodiments, e.g., during a fraud, the saved payment vehicle information may not actually be the consumer's payment vehicle information. Thereafter, the device may send a payment request by way of a computer network 120 to an acquirer processor (e.g., one of financial institutions 140).

A device may be identified by its device ID (e.g., a Unique Device ID (UDID)) by a component or system of environment 100. However, in some embodiments, a device may not necessarily be perceived or identified as the actual physical hardware (e.g., computer, tablet, phone, etc.). For example, a device (e.g., Device 1, Device 2) may be identified as an identifier of an application or operating system, TCP/IP address, an identifier of a SIM card, etc., which may happen to be used in an actual physical hardware conventionally known as "device" (e.g., computer, tablet, phone, etc.) but which may also happen to be temporary and/or portable (e.g., able to be used in other physical hardware devices). It is also contemplated that a device (e.g., computer, tablet, phone, etc.) may issue new device IDs due to slight deviations of data. For example, a change in a browser setting(s) may generate a new unique device ID. To prevent any confusion caused by the storage of multiple device IDs in the profile database 136, the multiple device IDs pertaining to a single physical hardware device (e.g., phone, tablet, computer, etc.) may be grouped or associated with an older device ID, based on a confidence score and/or predetermined confidence threshold based on the confidence score. The confidence score may be determined using, for example, by mapping information stored in the profile database and/or the transaction database. For example, a confidence that a newly generated device ID belongs to the same device as an older device ID may be increased by leveraging payment data obtained from the newly generated device ID. Thus, a new device ID generated by change the browser setting(s) of a device may be associated with the previous device ID with relatively high confidence. These features may help fraud detection and analytics computing system 150 detect a potential fraudster purposefully switching a device's ID to be able to get away with a fraudulent activity.

In general, fraud detection and analytics computing system 150 may be operated by an acquirer processor, issuer processor, card issuer, or any other financial institution 150. The fraud detection and analytics computing system 150 may be operated by another entity or operated independently. In any event, fraud detection and analytics computing system 150 may be configured to intercept authorization requests sent across payment network 120, or otherwise receive data about payment transactions sent between merchants 110 and financial institutions 140.

In an example embodiment, as shown in FIG. 1, a fraud detection and analytics computing system 150 comprises a processor 132, memory 134, profile database 136, transaction database 144, application server 138, and web server 142. As shown in FIG. 1, the profile database 136 for an individual further comprises a unique identifier hash recognizing the profile of an individual, primary account numbers (e.g., PANs) or other identifiers of payment vehicles (e.g. debit, credit cards) associated with the individual, any known device(s) used by or associated with the individual, personally identifiable information (PII), and/or data/analysis of an individual's spending habits, geographic area, and fraud activities reported on the cards or devices associated with the individual. In an example embodiment, the personally identifiable information (PII) about the individual involves at least one of his/her name, email address, date of birth, social security number, and physical address. In some embodiments, personally identifiable information may also extend to biometric information about the individual (e.g., eye or retina scan, fingerprint, eye color, hair color, etc.)

In the above embodiment, the fraud detection and analytics computing system 150 further comprises transaction database 144. The transaction database 144 comprises important transaction data associated with the payment vehicles 104 and 106. The transaction database may comprise tables containing source ID, terminal ID, date and time, IP address, location, and transaction amount for the transactions associated with payment vehicle 104 and payment vehicle 106, and devices used by or associated with the individual (e.g., device 1 106A, and device 2 106B).

Figure 2:
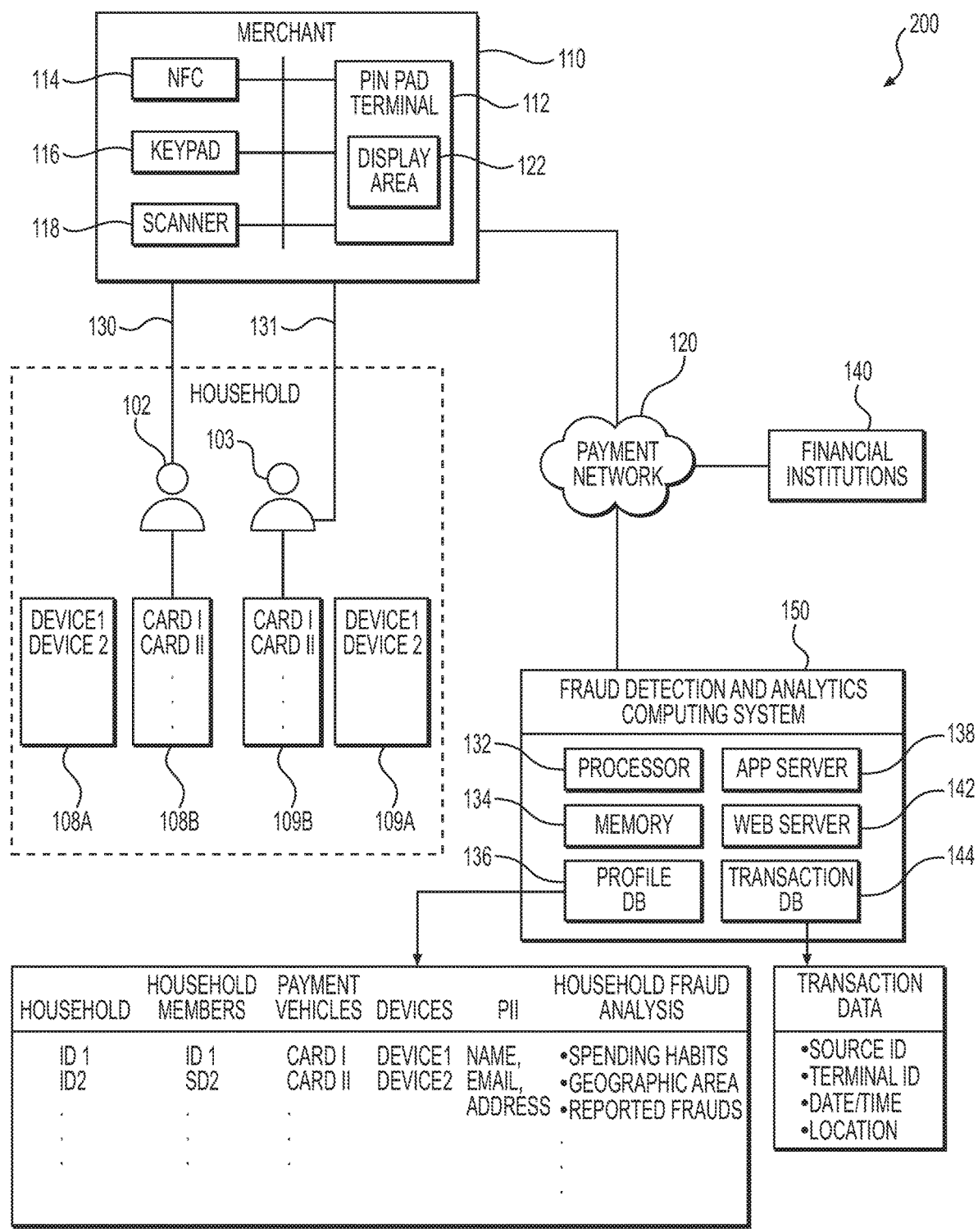
FIG. 2 depicts a block diagram of a fraud detection computing system infrastructure and aggregated database for establishing a fraud detection and analytics system from payment vehicles and devices used by consumers (e.g., at the household level).

Turning to FIG. 2, a fraud detection and analytics computing system for a household involves multiple related individuals (e.g., consumer 102 and consumer 103) using multiple payment vehicles (e.g., 108B and 109B). Furthermore, each individual of the household may use or be associated with multiple devices (e.g., 108A and 109A). As shown in FIG. 2, fraud detection and analytics computing system 150 comprises processor 132, memory 134, profile database 136, transaction database 144, application server 138, and web server 142. The profile database 136 for a household further comprises a unique identifier hash recognizing a household, unique IDs associated with each member of the household, payment vehicles (e.g. debit, credit cards) associated with each member of the household, devices associated with or used by the various individuals of the household, PII associated with each member of the household, and data/analysis of spending habits, geographic area, and reported fraud activities on the cards associated with each member of the household. In an example embodiment, the PII of each member of the household involves at least one of the member's name, email address, date of birth, and physical address. In some embodiments, the PII may extend to each member's biometric information.

According to one or more embodiments, the components of infrastructure 100 and 200 may be connected by a computer network 120, such as, for example a local area network (LAN) or a wireless network, such as, for example, a Wi-Fi network. However, other network connections among the components of infrastructure 100 may be used, such as, for example, a wide area network (WAN), the Internet, or the cloud. Methods of establishing fraud detection and analytics system for an individual and/or household according to one or more embodiments will be discussed with respect to FIGS. 3 and 4 below. Functions of the components of infrastructure 100 and 200 will be described below with respect to exemplary methods for fraud detection and analytics computing systems for individuals and households.

FIGS. 1 and 2 and the discussion above provide a brief, general description of a suitable computing environment in which the present disclosure may be implemented. In one embodiment, any of the disclosed systems, methods, and/or graphical user interfaces may be executed by or implemented by a computing system consistent with or similar to that depicted in FIGS. 1 and 2. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Figure 3:
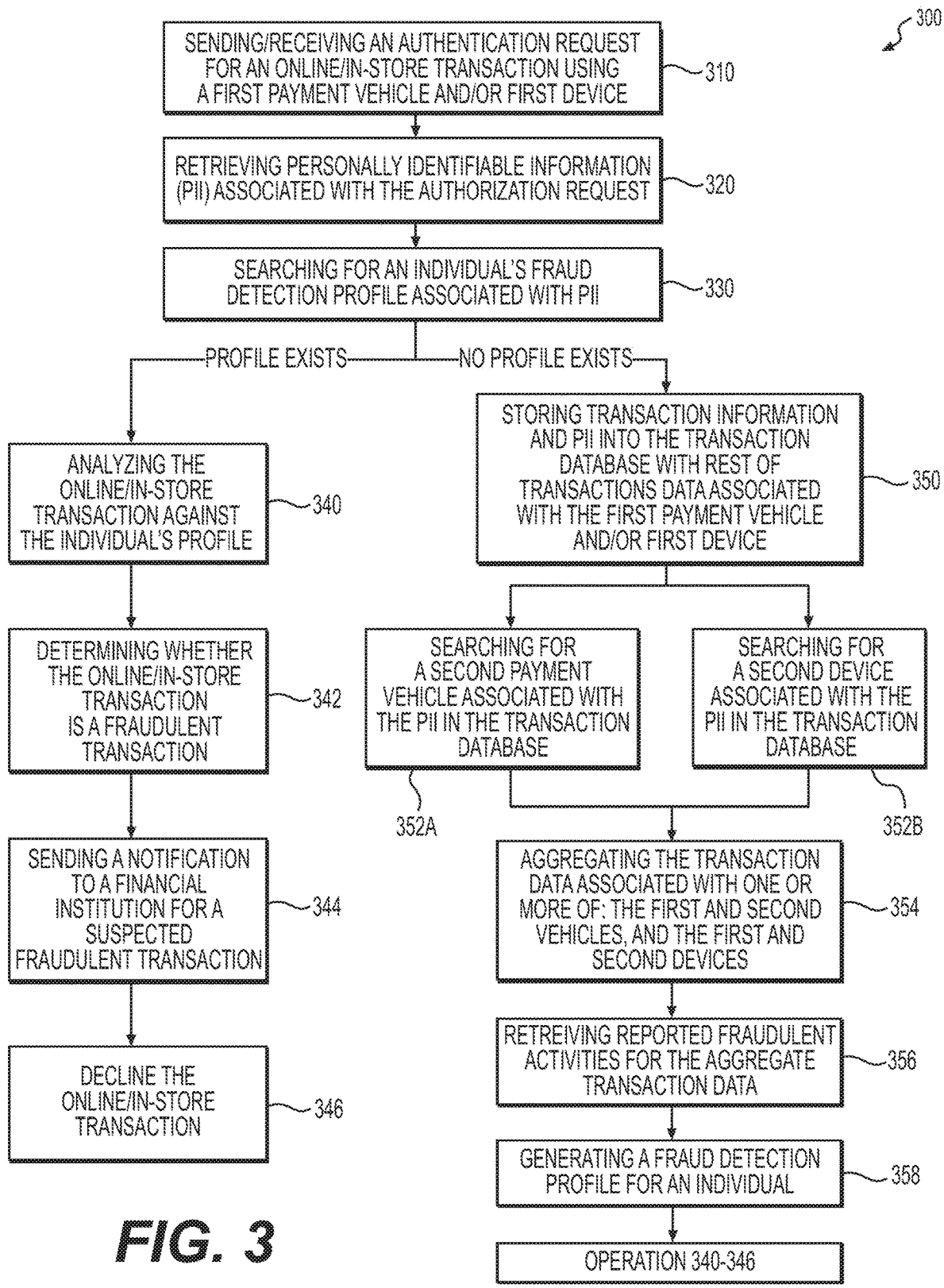
FIG. 3 depicts a flowchart of a method for establishing a fraud detection and analytics computing system and aggregated database from payment vehicles and devices used by individuals, according to one or more embodiments.

FIG. 3 illustrates a method 300 for establishing a fraud detection and analytics system for an individual. The fraud detection and analytics system may be referred to as "wallet and device based" because it may enable analysis and synthesizing of transaction and fraud data across all credit/debit cards within a consumer's wallet, and all devices used by or owned by the user. As described above with respect to FIGS. 1-2, a merchant 110 may request authorization for a transaction initiated using a payment vehicle or card (e.g., 104A-B, 108B, 109B, etc.) and/or using a device (e.g., 106A-B, 108A, 109A, etc.). In an example embodiment, the transaction may be for purchase of an item or a service, or for a withdrawal of cash. Thus, at step 310 of method 300 (FIG. 3), a merchant 110 may send (or an acquirer processor may receive) an authorization request for an online or brick-and-mortar transaction over a wireless network. Such an authorization request may be intercepted by or otherwise received at processor 132 of fraud detection and analytics computing system 150. At step 320, the processor 132 may retrieve identifying information associated with the transaction and transaction data from the authorization request before the authorization request is routed to a financial institution. The identifying information may include, for example, personally identifiable information (PII) of an individual associated with the transaction, a device fingerprint, device-specific information, an originating IP address, which may be determined through IP proxy piercing, etc. In some embodiments, the fraud detection and analytics computing system may receive information pertaining to the device used in the payment transaction leading to the authorization request ("device information"). The device information may be received, for example, from the merchant (e.g., an e-commerce site or server used by or belonging to the merchant) or from an acquiring financial institution. Furthermore, the fraud detection and analytics computing system may receive information pertaining to the payment vehicle (e.g., credit card, debit card, loyalty or rewards card, etc.) used in the payment transaction leading to the authorization request ("payment vehicle information" or "first payment vehicle information"). In some embodiments, the payment vehicle information for the payment vehicle used in the transaction may be a part of the authorization request and may be sent by merchant or acquirer, e.g., based on the payment vehicle information (e.g., PAN) provided by the consumer at a merchant ecommerce site or POS. In some embodiments, the payment vehicle information initially received from the merchant or acquirer may just be an identifier (e.g., PAN) of a payment vehicle. In such embodiments, the fraud detection and analytics computing system may use that identifier to retrieve further or more thorough payment vehicle information (e.g., of the payment vehicle used in the transaction) from an issuer or financial institution of the payment vehicle.

Further, at step 330, the processor 132 may search a profile database 136 for a fraud detection profile associated with the identifying information associated with the transaction.

In an example embodiment, if the processor 132 finds profile associated with the identifying information associated with the transaction in profile database 136, the acquirer processor may further analyze the transaction against the profile to determine whether the online or in-store transaction is fraudulent, as per steps 340 and 342. If the processor 132 determines, e.g., at step 342, that the transaction is fraudulent, then the acquirer processor may further send a notification to the web server 142 along with the authorization request, at step 344, which is sent to a financial institution 140. Financial institution 140 may, based on the fraud message, decline the transaction according to the notification provided by the processor 132, at step 346. The transaction data may comprise at least one of a merchant's ID, transaction location, terminal information, source IP address, date and time of the transaction, device information, transaction amount of the purchase, and payment vehicle information.

In another embodiment, if the processor 132 does not find a profile within the profile database 136, the processor 132 may store the transaction in a transaction database 144 (e.g., as in step 350). The processor 132 may further search for any additional payment vehicles associated with the retrieved identifying information associated with the transaction from the transaction database 144 (e.g., as in step 352A). Furthermore, the processor 132 may further search for any additional devices associated with the retrieved identifying information associated with the transaction from the transaction database 144 (e.g., as in step 352B). The processor 132 may aggregate transaction data associated with payment vehicle(s) and device(s) from the transaction database 144 (e.g., as in step 354). The processor 132 may retrieve any reported fraudulent activities from at least one financial institution 140, e.g., associated with the payment vehicle(s) and/or device(s) as per operation 356. At step 358, the processor 132 may generate a profile for an individual according to the retrieved identifying information associated with the transaction, aggregated transaction data from the payment vehicle(s) and/or device(s), and reported fraudulent activities from at least one financial institution 140. The processor 132 may also generate a unique hash value for the generated profile data for the individual (e.g., consumer 102). Once the profile data for the individual is generated, the processor 132 may analyze the online or brick-and-mortar transaction against the generated profile according to operation 340, and further determine whether the transaction is fraudulent as per step 342.

In the above-illustrated embodiment, the processor 132 may notify the financial institution 140 associated with the transaction if it determines the transaction to be fraudulent. The processor 132 may attach the notification to the authorization request before sending the authorization request to the web server 142 communicating with the financial institution 140. In another embodiment, the processor 132 may attach the fraudulent activity analysis to the authorization request before sending the request to the financial institution 140.

In an exemplary embodiment, the authorization request may be presented with the fraudulent activity analysis report at the graphical user interface associated with the web server 142. In another embodiment, the processor 132 may determine whether to decline or approve the transaction without involving the financial institution 140.

The method of establishing the fraud detection and analytics computing system disclosed herein may provide a multidimensional score for one in-store or online transactions for presentation to and use by a variety of different merchants and issuers. For example, the multidimensional fraud score may determine and communicate the likelihood of the transaction being fraudulent according to the analysis of the transaction in operation 340.

In one embodiment, the individual profile data are at least one of the individual's spending irregularities and analysis of reported fraudulent activity associated with the payment vehicles and device(s) linked to the individual. The spending irregularities of the individual are computed according to the individual's spending habits, geographic area, and type of payment vehicles and device(s) used for those payments. Additionally, the personally identifiable information (PII) may comprise at least one of a name, physical address, email address, etc. of the individual, wherein the payment vehicles 104 and 106 may be debit, loyalty, or credit cards, issued by at least one financial institution or merchant. In the exemplary embodiment, the microprocessor-enabled payment vehicles may be payment vehicles using computer chips to authenticate transactions according to Europay, MasterCard, and Visa (EMV) global standard. The contactless payment vehicles may be, for example, EMV or NFC compatible payment vehicles.

Figure 4:
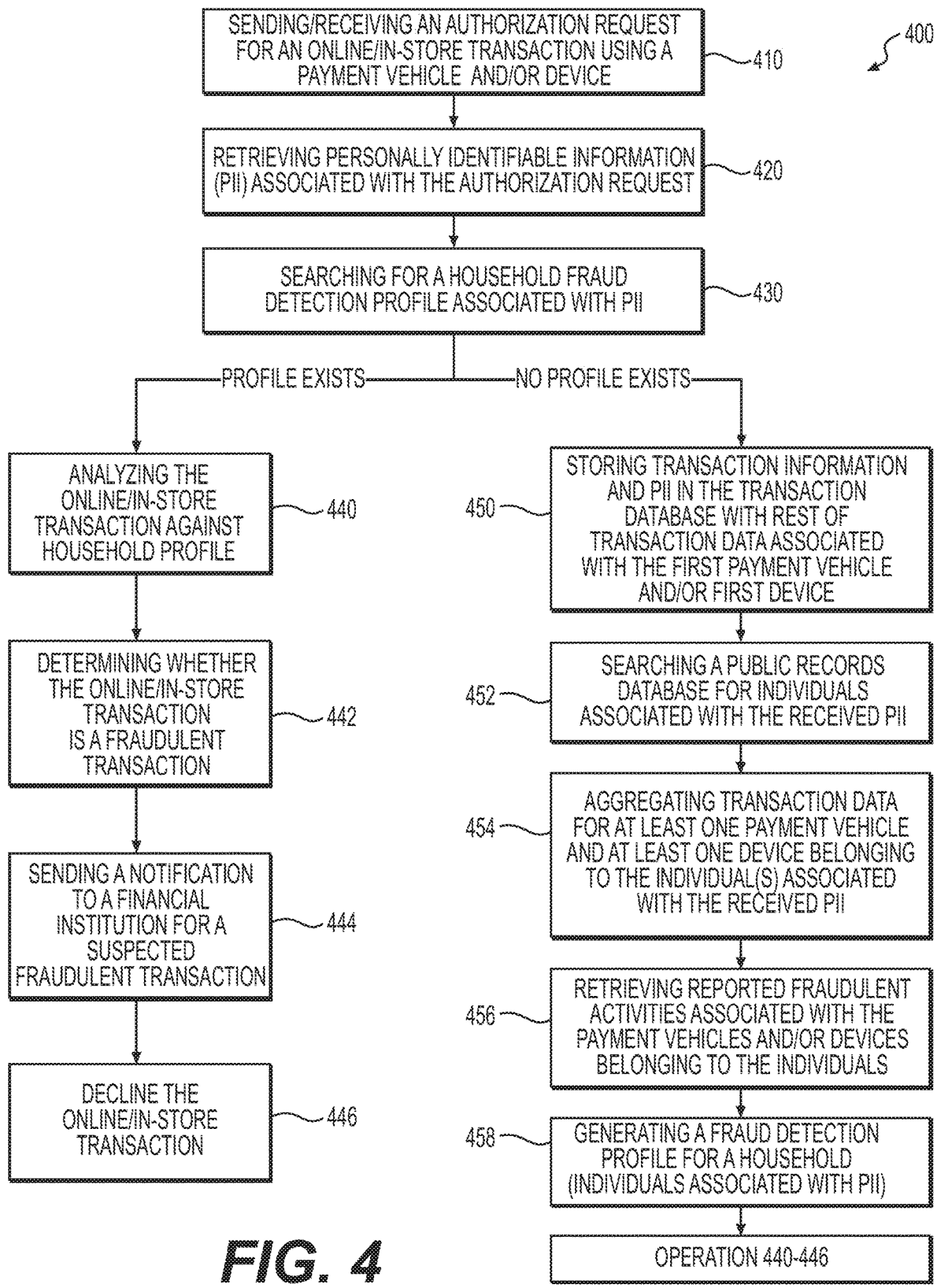
FIG. 4 depicts a flowchart of a method for establishing a fraud detection and analytics computing system and aggregated database from payment vehicles and devices used in households, according to one or more embodiments.

Turning to FIG. 4, exemplary systems and processes are disclosed for establishing a fraud detection and analytics system for a household. One of the members of a household may purchase a good or service at the merchant 110, either online or in-store, using one of the payment vehicles (e.g., 104A-B, 108A, or 109A) or device(s) (e.g., 106A-B, 108A, or 109B). Alternatively or additionally, the member(s) of the household may own, individually or collectively, devices 106A-B, 108A, or 109B. The merchant 110 may send the authorization request to the processor 132 over a computer network, and the processor may receive this request, as in step 410. The authorization request may be for an online and/or in-store transaction using a payment vehicle and/or a device. The processor 132 may retrieve transaction data and identifying information associated with the transaction from the authorization request before the authorization request is routed to a financial institution 140 (e.g., step 420). The identifying information may include, for example, personally identifiable information (PII) of an individual associated with the transaction, a device fingerprint, device-specific information, an originating IP address, which may be determined through IP proxy piercing, etc.

The processor 132 may further search whether a household fraud detection profile for the retrieved identifying information associated with the transaction exists in a profile database 136 (e.g., as in step 430). If the processor 132 determines that no household profile exists for retrieved identifying information associated with the transaction, the processor may store the transaction data with the rest of the transaction data associated with the payment vehicle and/or device at the merchant 110 (e.g., as in step 450).

The processor 132 may further search a public records database and profile database for individuals associated with the retrieved identifying information associated with the transaction. The processor 132 also may search for payment vehicles and/or device(s) associated with members of a household using the retrieved identifying information associated with the transaction in the transaction database 144. The processor 132 may aggregate transaction data from the transaction database 144 for the at least one payment vehicle (s) and device(s) belonging to the individuals associated with the received identifying information associated with the transaction. The processor 132 also may retrieve reported fraudulent activities pertaining to the payment vehicles and/or device(s), (e.g., as in step 456). In some embodiments, the reported fraudulent activities may be retrieved from one or more financial institutions 140.

In the above-explained embodiment, the processor 132 may generate household profile data involving each member of the household according to the retrieved identifying information associated with the transaction, PII of the individual, the aggregated transaction data associated with the payment vehicle(s) and/or device(s), and reported fraudulent activities on the payment vehicle(s) and/or device(s). The processor 132 may further generates the household profile presenting the household member's spending irregularities and suspicious activities associated with the at least one payment vehicles linked to the household profile. In the above exemplary embodiment, the household member's spending irregularities are calculated based on at least one of the member's spending habits, geographic area, and type of payment vehicle(s) and/or device(s).

The acquirer further generates a unique hash value for generated household profile data and links the members of the household profile with the generated unique hash value. In another embodiment, if only one individual's information is retrieved, the processor 132 may generate an individual profile over household profile data.

In an alternative embodiment, the processor 132 may search the profile database 136 to find individual profiles related to retrieved identifying information associated with the transaction. The processor 132 may link the unique hash value associated with individual profiles to the household profile hash value for the household members with individual profiles. In the above embodiment, the linking profile data may comprise generating, a rollup identifier identifying the household, wherein the rollup identifier provides a pointer to the unique hash value associated with the profile data of household members, and wherein the rollup identifier is common to a plurality of household members.

In a different exemplary embodiment, the processor 132 may search for both household profile and an individual profile for the retrieved identifying information associated with the transaction in the profile database 136. The search derives either the household or an individual profile for the retrieved identifying information associated with the transaction in the profile database 136.

In an example embodiment, the processor 132 may analyze the online or in-store transaction against the profile data associated with each member of the household as per operation. The processor 132 may send a notification to the financial institution reporting any online or in-store transaction is determines to be fraudulent. The financial institution 140 may decline the online or in-store transaction according to the notification provided from the processor 132 as per operation 446.

In one embodiment, the processor 132 may generate a multidimensional score for the online or in-store transaction according to the household profile. The acquirer processor may provide score embedded to every transaction to the financial institution 140. The multidimensional score may be a score representing the probability that the transaction is fraudulent.

Figure 5:
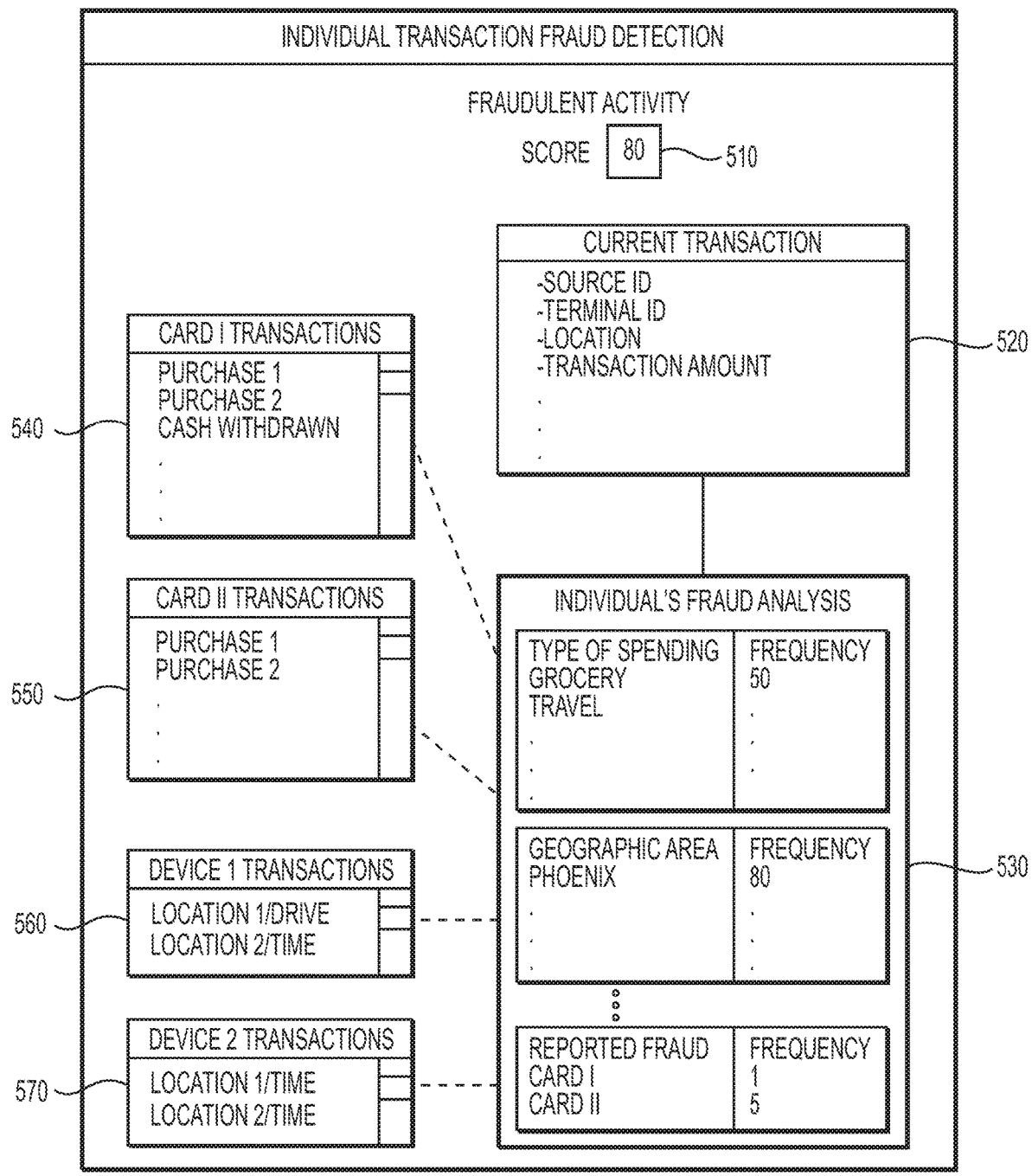
FIG. 5 depicts a screenshot of an exemplary presentation of an individual (e.g., "wallet and device(s) level") fraud detection and analytics analysis, according to one or more embodiments.

FIG. 5 is an example representation of transaction analysis presented to an end user. The end user may be, for example, a financial institution 140, merchant 110, consumer 102, a member of a household, or third party that seeks to study fraud data. For example, a consumer or merchant who may have been the victim or an innocent party to a fraudulent transaction may want to view the transaction analysis, e.g., to track down a perpetrator or to prevent further fraudulent activity. The presentation further provides transaction data for view to the end user, e.g., at step 520. The individual fraud analysis (step 530) may include determining frequencies of spending habits, irregularities, geographic area and reported fraudulent activities. The fraudulent activity score 510 may be determined according to the frequencies of spending habits, irregularities, geographic area and reported fraudulent activities, as shown in step 530. In some embodiments, an end user may customize the calculation of the score, e.g., by emphasizing, deem phasizing, and/or toggling on/off certain factors in the calculation. Thus, in some embodiments, a fraud analysis may involve a comparison to transactions performed by the individual using other payment vehicles (e.g., as in 540 and 550), or using other devices (e.g., 560 and 570).

Figure 6:
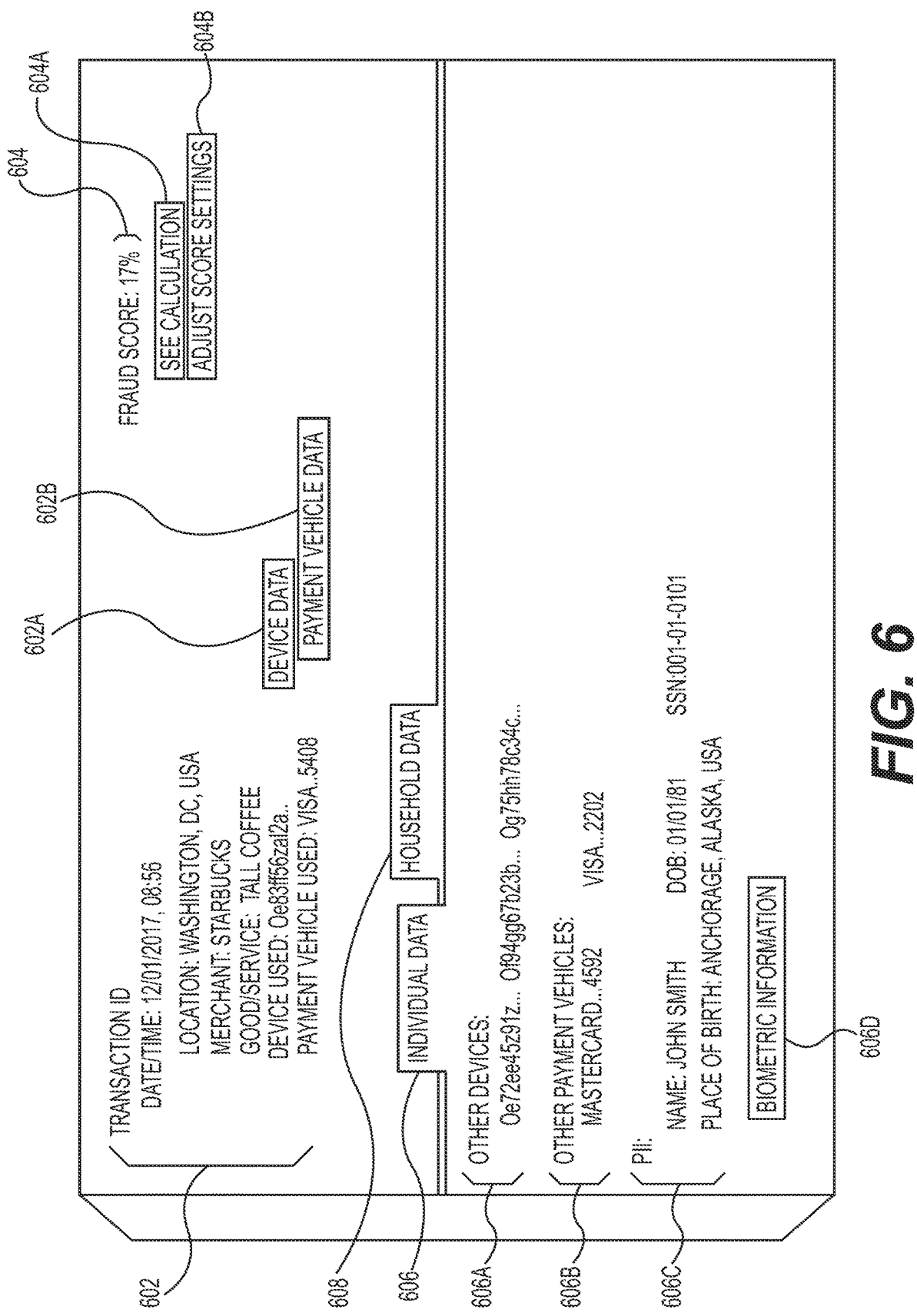
FIG. 6 depicts a screenshot of an exemplary user interface showing fraud detection and analytics as it relates to data and devices pertaining to an individual and/or the individual's household.

FIG. 6 depicts a screenshot of an exemplary user interface showing fraud detection and analytics as it relates to data and devices pertaining to an individual and/or the individual's household. Various embodiments of the present disclosure describe a user interface of data analytics that an end user (e.g. merchant, consumer who is a victim of fraud, acquirer, issuer, the government, or crime prevention body) may use to assess an individual or household connected with a transaction, receive a fraud score or assessment of a likelihood of fraud regarding the transaction, and customize such fraud score or assessment.

As shown in FIG. 6, an exemplary screenshot of at least one embodiment of the user interface may present information 602 regarding a transaction, which may allegedly be fraudulent. The transaction information 602 may include, for example, an identification of the transaction (e.g., "transaction ID"), date and/or time of the transaction, a location of the transaction, an identifier of the merchant, an identifier of the transacted good and/or service, a identifier of the device being used, and the payment vehicle being used. In some embodiments, a functionality may allow the user to look up more information regarding the device being used (e.g., device data 602A). Likewise, a functionality may allow the user to look up more information regarding the payment vehicle being used (e.g., payment vehicle data 602B). It is contemplated that information regarding payment vehicle(s) used or owned by an individual or household may be obtained and provided by financial institutions (e.g., issuers). Furthermore, it is contemplated that information regarding the device(s) used or owned by an individual or household may be obtained and provided by merchants or acquirers. For example, a merchant site may be able to obtain information regarding the device(s) used by a fraudster. Information regarding a device may include, for example, an identifier of the device, passwords and/or user names, IP addresses, browser settings, browser history, cookies, font and language preferences, and other settings. In some embodiments, a merchant site may be able to detect various mannerisms related to a user's typing (e.g., whether a user is left or right handed, typing speed, common typos, etc.) For example, based on gathered information from multiple device(s) used by a fraudster, a merchant site may be able to link the various device(s) to the fraudster. Likewise, a merchant site may allow the linking of various accounts, user names, and/or passwords to fraudster, based on their being used on a single device. In some information, the linking together of various device information to an individual or household may be performed by a third party. The strength of the consistency of the various gathered information may be used, for example, to determine the fraud score and/or assessment. A user may be able to see the calculation 604A of the fraud score or assessment, or be able to adjust the score settings 604B. For example, the user may choose discount the effect of a user's typing mannerisms in the fraud score calculation.

Figure 7:
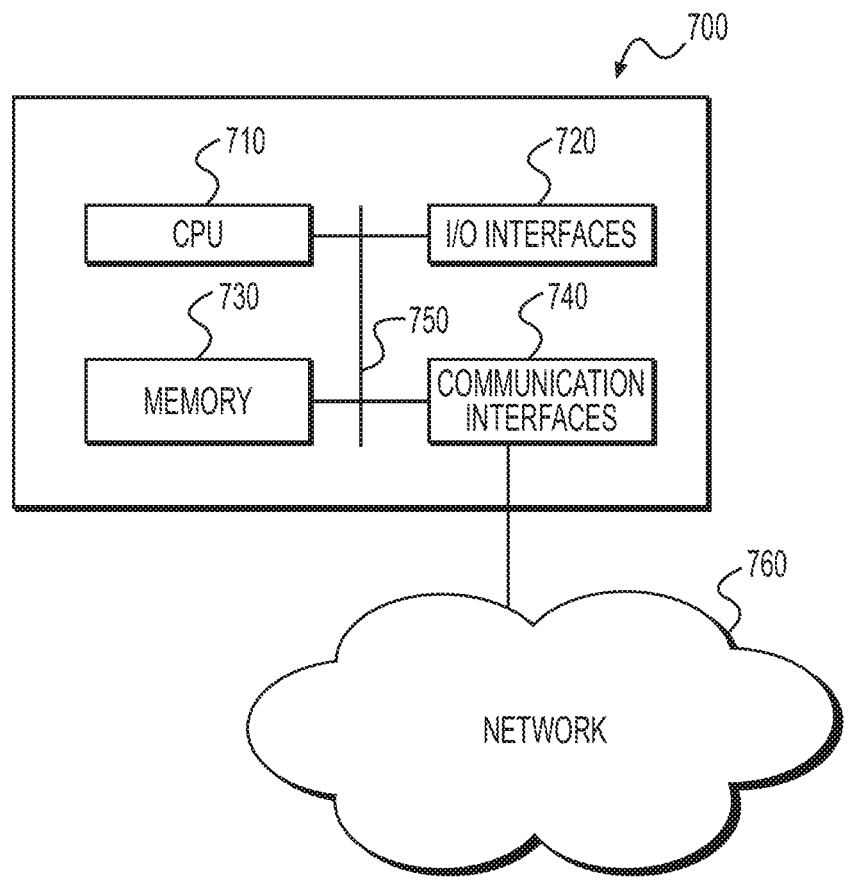
FIG. 7 depicts an example of a computing device for establishing a fraud detection and analytics computing system and aggregated database for payment vehicles and devices.

Still referring to FIG. 6, some embodiments of the user interface may enable the user to view information pertaining to other devices 606A or other payment vehicles 606B used or owned by the individual. Furthermore, user interface may also present various PII 606C of the individual to which other information may be linked. The PII may include, for example, the name, date of birth, social security number, place of birth, and, in some embodiments, biometric information 606D of the individual. In some embodiments, the user interface may enable the user to view information pertaining to not only the individual 606 but the individual's household 606. It is contemplated that having household data may also allow the user to better track a fraudulent transaction, e.g., if a fraudster borrows the device of another member of the fraudster's household to commit the crime. The systems and processes described the above by the processor may be performed on or between one or more computing devices. FIG. 7 illustrates an example computing device. A computing device 700 may be a server, a computing device that is integrated with other systems or subsystems, a mobile computing device such as a smart phone, a cloud-based computing ability, and so forth. The computing device 700 may be any suitable computing device as would be understood in the art, including without limitation, a custom chip, and embedded processing device, a tablet computing device, a POS terminal associated with the merchant 110, a back-office system of a merchant 110, a personal data assistant (PDA), a desktop, laptop, microcomputer, and minicomputer, a server, a mainframe, or any other suitable programmable device. In various embodiments disclosed herein, a single component may be replaced by multiple components and multiple components may be replaced by single component to perform a given function or functions. Except where such substitution would not be operative, such substitution is within the intended scope of the embodiments.

The computing device 700 includes a processor 702 that may be any suitable type of processing unit, for example a general-purpose central processing unit (CPU), a reduced instruction set computer (RISC), a processor that has a pipeline or multiple processing capability including having multiple cores, a complex instruction set computer (CISC), a digital signal processor (DSP), application specific integrated circuits (ASIC), a programmable logic devices (PLD), and a field programmable gate array (FPGA), among others. The computing resources may also include distributed computing devices, cloud computing resources, and virtual computing resources in general.

The computing device 700 also includes one or more memories 706, for example read-only memory (ROM), random access memory (RAM), cache memory associated with the processor 702, or other memory such as dynamic RAM (DRAM), static RAM (SRAM), programmable ROM (PROM), electrically erasable PROM (EEPROM), flash memory, a removable memory card or disc, a solid-state drive, and so forth. The computing device 700 also includes storage media such as a storage device that may be configured to have multiple modules, such as magnetic disk drives, floppy drives, tape drives, hard drives, optical drives and media, magneto-optical drives and media, compact disk drives, Compact Disc Read Only Memory (CD-ROM), compact disc recordable (CD-R), Compact Disk Rewritable (CD-RW), a suitable type of Digital Versatile Disc (DVD) or BluRay disc, and so forth. Storage media such as flash drives, solid-state hard drives, redundant array of individual discs (RAID), virtual drives, networked drives and other memory means including storage media on the processor 702, or memories 706 are also contemplated as storage devices. It may be appreciated that such memory may be internal or external with respect to operation of the disclosed embodiments. It may be appreciated that certain portions of the processes described herein may be performed using instructions stored on a computer readable medium or media that direct computer system to perform the process steps. Non-transitory computable-readable media, as used herein, comprises all computer-readable media except for transitory, propagating signals.

Networking communication interfaces 712 may be configured to transmit to, or receive data from, other computing devices 700 across a network 714. The network and communication interfaces 712 may be an Ethernet interface, a radio interface, a Universal Serial Bus (USB) interface, or any other suitable communications interface and may include receivers, transmitter, and transceivers. For purposes of clarity, a transceiver may be referred to as a receiver or a transmitter when referring to only the input or only the output functionality of the transceiver. Example communication interfaces 712 may include wire data transmission links such as Ethernet and TCP/IP. The communication interfaces 712 may include wireless protocols for interfacing with private or public networks 714. For example, the network and communication interfaces 712 and protocols may include interfaces for communicating with private wireless networks such as Wi-Fi network, one of the IEEE 802.11x family of networks, or another suitable wireless network. The network and communication interfaces 712 may include interfaces and protocols for communicating with public wireless networks 714, using for example wireless protocols used by cellular network providers, including Code Division Multiple Access (CDMA) and Global System for Mobile Communications (GSM). A computing device 700 may use network and communication interfaces 712 to communicate with hardware modules such as a database or data store, or one or more servers or other networked computing resources. Data may be encrypted or protected from unauthorized access.

In various configurations, the computing device 700 may include a system bus 710 for interconnecting the various components of the computing device 700, or the computing device 700 may be integrated into one or more chips such as programmable logic device or application specific integrated circuit (ASIC). The system bus 716 may include a memory controller, a local bus, or a peripheral bus for supporting input and output devices 704, and communication interfaces 712. Example input and output devices 704 include keyboards, keypads, gesture or graphical input devices, motion input devices, touchscreen interfaces, one or more displays, audio units, voice recognition units, vibratory devices, computer mice, and any other suitable user interface.

The processor 702 and memory 706 may include non-volatile memory for storing computable-readable instructions, data, data structures, program modules, code, microcode, and other software components for storing the computer-readable instructions in non-transitory computable-readable mediums in connection with the other hardware components for carrying out the methodologies described herein. Software components may include source code, compiled code, interpreted code, executable code, static code, dynamic code, encrypted code, or any other suitable type of code or computer instructions implemented using any suitable high-level, low-level, object-oriented, visual, compiled, or interpreted programming language.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method, implemented by a computing system using a memory and a processor, for automated fraud detection and analytics using aggregated payment vehicles and devices, the method comprising:

training, by the computing system, an aggregated fraud scoring system to detect fraudulent transactions using a database of transaction data aggregated for a plurality of individuals and indexed to individuals using identifying information associated with a transaction;

receiving, by the computing system over a computer network, an authorization request for a payment transaction originating at a merchant, using a first payment vehicle;

receiving, by the computing system over a computer network, device information of a first device owned by an individual and used in the payment transaction originating at the merchant;

retrieving, at the computing system from the database of transaction data, transaction data and identifying information associated with one or more of the authorization request, the first payment vehicle, or the first device before the authorization request is routed to a financial institution;

determining, by the computing system, whether an individual fraud detection profile associated with the retrieved identifying information exists in a profile database including identifiers of payment vehicles associated with an individual and any known devices associated with an individual;

searching, by the computing system in the database of transaction data, for a second payment vehicle and/or second device associated with the identifying information, using the identifying information at the transaction database, based on determining the individual fraud detection profile does not exist in the profile database;

generating profile data for an individual associated with the identifying information according to aggregated transaction data associated with the first payment vehicle, the second payment vehicle, the first device, and/or the second device;

automatically analyzing, using the trained aggregated fraud scoring system, the payment transaction against the generated profile data;

automatically determining, using the trained aggregated fraud scoring system, whether the payment transaction is a fraudulent activity based on the analyzing the payment transaction against the generated profile data, as a fraudulent activity analysis report to improve a prediction of a fraudulent transaction relative to a system that monitors buying behavior of a cardholder at an individual card level;

storing, by the computing system, information associated with the generated profile data and the determining whether the payment transaction is a fraudulent activity in the individual fraud detection profile in the profile database;

automatically declining the authorization request for the payment transaction based on a result of the determining that the payment transaction is a fraudulent activity; and presenting the authorization request and the fraudulent activity analysis report at a graphical user interface.

2. The method of claim 1, further comprising:

sending, over the computer network, as a result of determining that the payment transaction is a fraudulent activity, a notification to the financial institution for the fraudulent activity.

3. The method of claim 1, further comprising:

storing, at a transaction database, as a result of determining that the individual's fraud detection profile does not exist, transaction data with other transaction data associated with the first payment vehicle or the first device;

aggregating, by the computing system, transaction data associated with one or more of: the first payment vehicle, the second payment vehicle, the first device, or the second device, from the transaction database;

retrieving, from the at least one financial institution, reported fraudulent activities pertaining to the first payment vehicle, the second payment vehicle, the first device, and/or the second device; and generating, by the computing system, a unique hash value for the generated profile data associated with the individual, wherein the profile data for the individual is further generated according to the at least one of the identifying information associated with the authorization request, personally identifiable information (PII) of the individual, and reported fraudulent activities on the first payment vehicle, the second payment vehicle, the first device, and/or the second device.

4. The method of claim 3, further comprising, generating, at the computing system, a multidimensional score for the at least one transaction associated with the first payment vehicle, the second payment vehicle, the first device, and/or the second device.

5. The method of claim 3, wherein the individual's profile data includes at least one of the individual's spending irregularities and fraud analysis according to the reported fraudulent activities associated with the first payment vehicle, the second payment vehicle, the first device, and/or the second device.

6. The method of claim 3, wherein the individual's spending irregularities are calculated based on at least one of the individual's spending habits, geographic area, and type of payment vehicle.

7. The method of claim 1, further comprising, identifying, by the computing system, any fraudulent suspicion pertaining to the payment transaction to the at least one financial institution.

8. The method of claim 3, wherein the personally identifiable information (PII) comprises at least one of name, physical address, email address, or biometric information.

9. The method of claim 1, the transaction data comprises of at least one of merchant's ID, transaction location and terminal information, source IP address, data and time, device information, transaction amount of the purchase, and the payment vehicle information.

10. The method of claim 3, wherein the first and second payment vehicles are debit or credit cards issued by the at least one financial institution.

11. The method of claim 1, wherein the searching whether the individual fraud detection profile associated with the retrieved identifying information associated with the authorization request exists includes searching for a unique hash value associated with an individual fraud detection profile for the retrieved identifying information associated with the authorization request in the profile database.

12. The method of claim 1, wherein device information comprises, one or more of: an identifier of the device, passwords, user names and accounts, IP addresses, browser settings, browser history, cookies, font preferences, language preferences, and typing data.

13. A method, implemented by a computing system using a memory and a processor, for automated fraud detection and analytics using aggregated payment vehicles and devices for a household, the method comprising:

training, by the computing system, an aggregated fraud scoring system to detect fraudulent transactions using a database of transaction data aggregated for a plurality of households and indexed to households using identifying information associated with a transaction;

receiving, by the computing system over a computer network, an authorization request for a payment transaction originating at a merchant, using a first payment vehicle;

receiving, by the computing system over a computer network, device information of a first device owned by a household and used in the payment transaction originating at the merchant;

retrieving, at the computing system from the database of transaction data, transaction data and identifying information associated with one or more of the authorization request, the first payment vehicle, or the first device before the authorization request is routed to a financial institution;

searching and determining, by the computing system, whether a household fraud detection profile associated with the retrieved identifying information exists in a profile database for an individual and including identifiers of payment vehicles associated with the household and any known devices associated with the household;

if a household fraud detection profile associated with the retrieved identifying information does not exist in the profile database, storing, at a transaction database, transaction data with other transaction data associated with the first payment vehicle or first device;

searching and determining, by the computing system using the database of transaction data, second payment vehicles and devices associated with members of the household using retrieved identifying information associated with the authorization request in the transaction database;

generating profile data for each member of the household according to aggregated transaction data associated with the first payment vehicle, the second payment vehicle, the first device, and/or the second device;

automatically analyzing, using the trained aggregated fraud scoring system, the payment transaction against the generated profile data associated with each member of the household;

automatically determining, using the trained aggregated fraud scoring system, whether the payment transaction is a fraudulent activity based on the analyzing the payment transaction against the generated profile data, as a fraudulent activity analysis report to improve a prediction of a fraudulent transaction relative to a system that monitors buying behavior of a cardholder at an individual card level;

storing, by the computing system, information associated with the generated profile data and the determining whether the payment transaction is a fraudulent activity in the household fraud detection profile in the profile database;

automatically declining the authorization request for the payment transaction based on a result of the determining that the payment transaction is a fraudulent activity; and presenting the authorization request and the fraudulent activity analysis report at a graphical user interface.

14. The method of claim 13, further comprising:

aggregating, by the computing system, transaction data associated with the payment vehicles and devices from the transaction database;

retrieving, from the at least one financial institution, reported fraudulent activities pertaining to the payment vehicles and devices;

generating, by the computing system, a unique hash value for the generated profile data associated with the members of household;

linking, by the computing system, the unique hash value for the profile data associated with the members of the household to a unique hash value for a household; and sending, over the computer network, as a result of determining that the payment transaction is a fraudulent activity, a notification to the financial institution reporting the fraudulent activity, wherein the profile data for each member of the household is further generated according to the at least one of the identifying information associated with the authorization request, personally identifiable information (PII) of one or more members of the household, and reported fraudulent activities on the payment vehicles and devices.

15. The method of claim 14, further comprising, generating, at the computing system, a multidimensional score to the payment transaction according to the at least one payment vehicle and at least one device associated with the household profile.

16. The method of claim 14, further comprising, generating the household profile presenting the household member's spending irregularities and suspicious activities associated with the at least one payment vehicles or at least one devices linked to the household profile.

17. A system for automated fraud detection and analytics using aggregated payment vehicles and devices, comprising:

a memory having processor-readable instructions stored therein; and a processor configured to access the memory and execute the processor-readable instructions, which when executed by the processor configures the processor to perform a plurality of functions, including functions to:

train, by a computing system including the memory and the processor, an aggregated fraud scoring system to detect fraudulent transactions using a database of transaction data aggregated for a plurality of individuals and indexed to individuals using identifying information associated with a transaction;

receive, over a computer network, an authorization request for a payment transaction originating at a merchant, using a first payment vehicle;

receive, over a computer network, device information of a first device owned by an individual and used in the payment transaction originating at the merchant;

retrieve, from the database of transaction data, transaction data and identifying information associated with one or more of the authorization request, the first payment vehicle, or the first device, before the authorization request is routed to a financial institution;

search and determine whether an individual fraud detection profile associated with the retrieved identifying information exists in a profile database including identifiers of payment vehicles associated with an individual and any known devices associated with an individual;

if an individual fraud detection profile associated with the retrieved identifying information does not exist in a profile database, store transaction data at a transaction database with other transaction data associated with the first payment vehicle or first device;

search, in the database of transaction data, for a second payment vehicle and/or second device associated using the identifying information at the transaction database;

generate profile data for an individual according to aggregated transaction data associated with the first payment vehicle, the second payment vehicle, the first device, and/or the second device;

automatically analyze, using the trained aggregated fraud scoring system, the payment transaction against the generated profile data;

automatically determine, using the trained aggregated fraud scoring system, whether the payment transaction is a fraudulent activity based on the analyzing the payment transaction against the generated profile data, as a fraudulent activity analysis report to improve a prediction of a fraudulent transaction relative to a system that monitors buying behavior of a cardholder at an individual card level;

storing, by the computing system, information associated with the generated profile data and the determining whether the payment transaction is a fraudulent activity in the individual fraud detection profile in the profile database;

automatically decline the authorization request for the payment transaction based on a result of the determining that the payment transaction is a fraudulent activity; and presenting the authorization request and the fraudulent activity analysis report at a graphical user interface.

18. The system of claim 17, wherein the processor is further configured to:
aggregate transaction data associated with one or more of: the first payment vehicle, the second payment vehicle, the first device, or the second device, from the transaction database;
retrieve, from the at least one financial institution, reported fraudulent activities pertaining to the first payment vehicle, the second payment vehicle, the first device, and/or the second device;
generate a unique hash value for the generated profile data associated with the individual; and
send, over the computer network, as a result of determining that the payment transaction is a fraudulent activity, a notification to a web server associated with the financial institution reporting the fraudulent activity,
wherein the profile data for the individual is further generated according to the at least one of the identifying information associated with the authorization request, personally identifiable information (PII) of the individual, and reported fraudulent activities on the first and the second payment vehicles.

19. The system of claim 18, wherein the processor is further configured to generate a multidimensional score for the payment transaction associated with the first payment vehicle, the second payment vehicle, the first device, and/or the second device.

20. The system of claim 18, wherein the analysis of the payment transaction against the profile data is according to the individual's spending irregularities and suspicious activities associated with the first payment vehicle, the second payment vehicle, the first device, and/or the second device.

* * * * *